US009567017B2

(12) United States Patent
Menicovich et al.

(10) Patent No.: US 9,567,017 B2
(45) Date of Patent: Feb. 14, 2017

(54) ACTIVE MODULAR AERODYNAMIC DRAG REDUCTION SYSTEM

(71) Applicant: RENSSELAER POLYTECHNIC INSTITUTE, Troy, NY (US)

(72) Inventors: David Menicovich, Hoboken, NJ (US); Michael Amitay, Loudonville, NY (US); Daniele Gallardo, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 14/647,153

(22) PCT Filed: Feb. 18, 2014

(86) PCT No.: PCT/US2014/016809
§ 371 (c)(1),
(2) Date: May 26, 2015

(87) PCT Pub. No.: WO2014/130425
PCT Pub. Date: Aug. 28, 2014

(65) Prior Publication Data
US 2015/0321707 A1 Nov. 12, 2015

Related U.S. Application Data

(60) Provisional application No. 61/766,193, filed on Feb. 19, 2013.

(51) Int. Cl.
*B62D 35/00* (2006.01)
*B62D 37/02* (2006.01)
(52) U.S. Cl.
CPC ............... *B62D 37/02* (2013.01); *B62D 35/00* (2013.01); *B62D 35/001* (2013.01)

(58) Field of Classification Search
CPC ........ B62D 35/00; B62D 35/001; B62D 37/02
(Continued)

(56) References Cited

U.S. PATENT DOCUMENTS 5,908,217 A * 6/1999 Englar ............... B62D 37/02
296/180.1
8,007,030 B2 * 8/2011 Wood ................ B62D 35/001
296/180.1
(Continued)

FOREIGN PATENT DOCUMENTS

WO    WO 2006/053144 A1    5/2006

OTHER PUBLICATIONS

PCT Written Opinion issued in PCT Application No. PCT/US2014/016809 dated Jun. 18, 2014.
(Continued)

*Primary Examiner* — Atul Trivedi
(74) *Attorney, Agent, or Firm* — RatnerPrestia

(57) ABSTRACT

Systems and methods for airflow control of a moving ground vehicle are provided. The system includes an actuator module and a sensor unit mounted on the vehicle, and a controller. The actuator module includes at least one synthetic jet actuator to generate a synthetic jet, to modify an airflow around the vehicle. The sensor unit includes at least one environment sensor to capture environmental sensor data proximate the vehicle. The controller receives the environmental sensor data from the sensor unit and determines at least one of a drive frequency and a drive amplitude for controlling the at least one synthetic jet actuator, based on the received environmental data.

18 Claims, 16 Drawing Sheets

(58) Field of Classification Search
USPC .......................................... 296/180.1; 701/49
See application file for complete search history.

(56) References Cited

U.S. PATENT DOCUMENTS

| | | | |
|---|---|---|---|
| 8,196,993 B2 | 6/2012 | Smith | |
| 8,382,194 B2* | 2/2013 | Wood | B62D 35/001 296/180.4 |
| 2003/0227194 A1 | 12/2003 | Farlow et al. | |
| 2007/0013209 A1* | 1/2007 | Neuburger | G01C 21/26 296/180.4 |
| 2007/0187990 A1* | 8/2007 | Shahbazi | B62D 37/02 296/180.1 |
| 2007/0257512 A1 | 11/2007 | Anderson | |
| 2008/0093886 A1* | 4/2008 | Nusbaum | B62D 35/001 296/180.1 |
| 2009/0256386 A1* | 10/2009 | Wood | B62D 35/001 296/180.1 |
| 2011/0068603 A1* | 3/2011 | Domo | B62D 35/001 296/180.1 |
| 2012/0292945 A1* | 11/2012 | Nusbaum | B62D 35/001 296/180.4 |
| 2012/0319428 A1* | 12/2012 | Wood | B62D 35/001 296/180.4 |
| 2013/0158828 A1* | 6/2013 | McAlister | B01J 19/20 701/70 |
| 2014/0019010 A1* | 1/2014 | Smith | B62D 35/001 701/49 |
| 2014/0035315 A1* | 2/2014 | Otterstrom | B62D 35/001 296/180.2 |
| 2015/0108787 A1* | 4/2015 | Schmidt | B62D 35/001 296/180.2 |
| 2015/0210323 A1* | 7/2015 | Morrison | B62D 35/00 296/180.4 |
| 2015/0251711 A1* | 9/2015 | Carlson | B62D 35/00 296/180.1 |

OTHER PUBLICATIONS

International Search Report issued in PCT International Application No. PCT/US2014/016809 mailed Jun. 18, 2014.

* cited by examiner

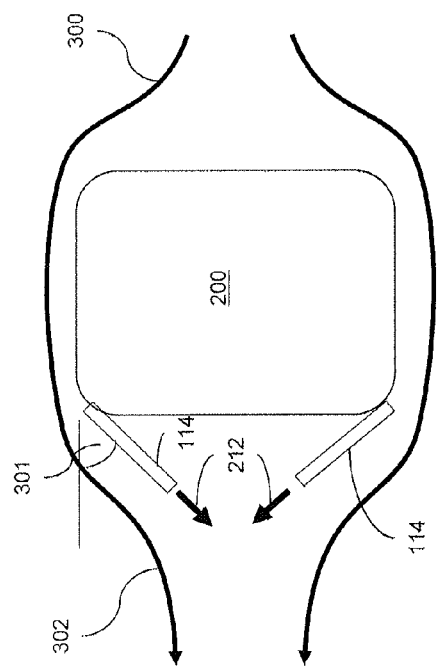
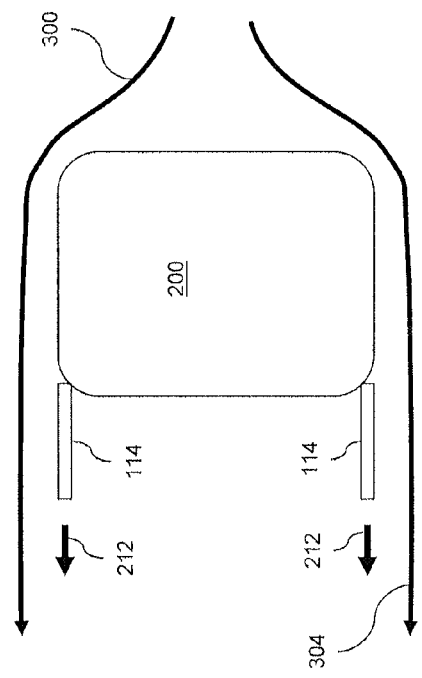

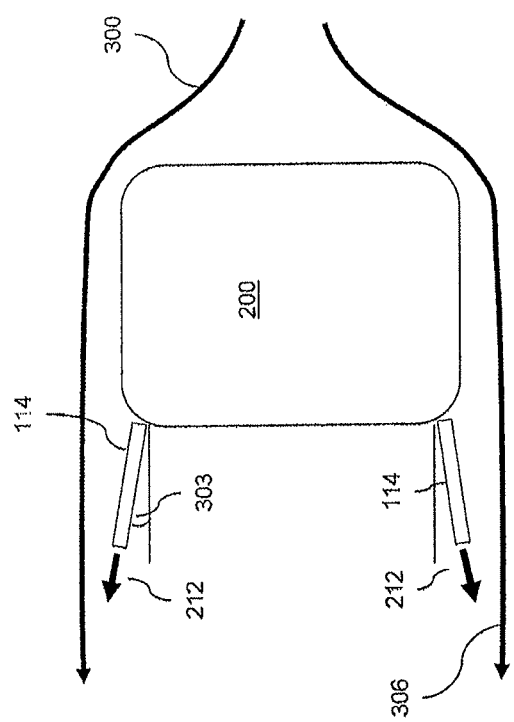

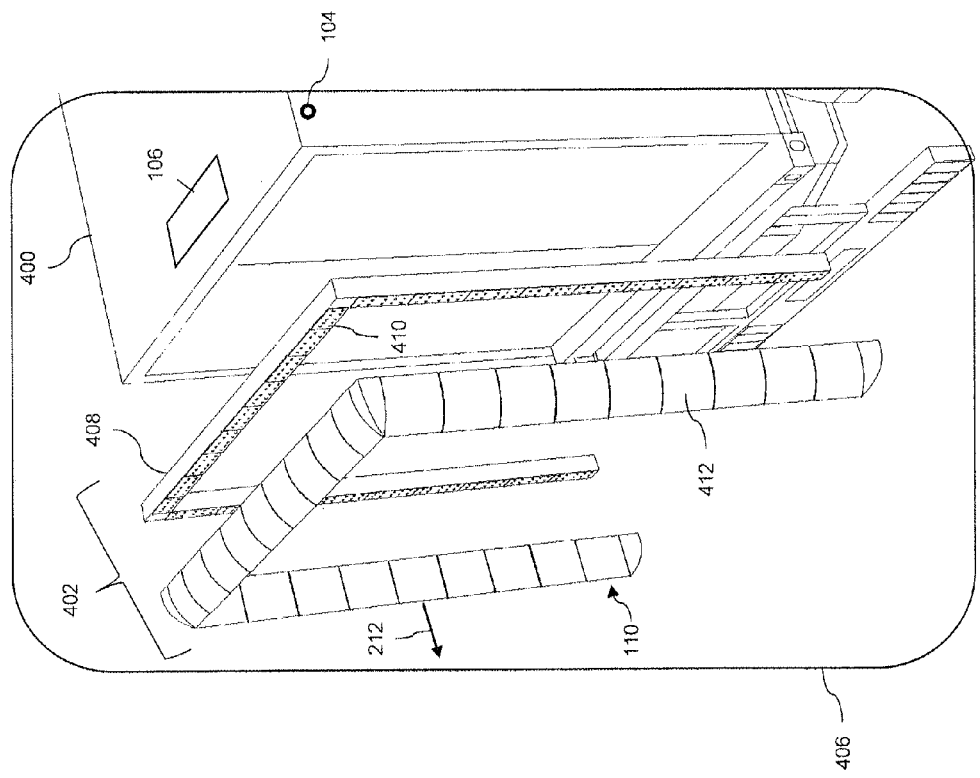

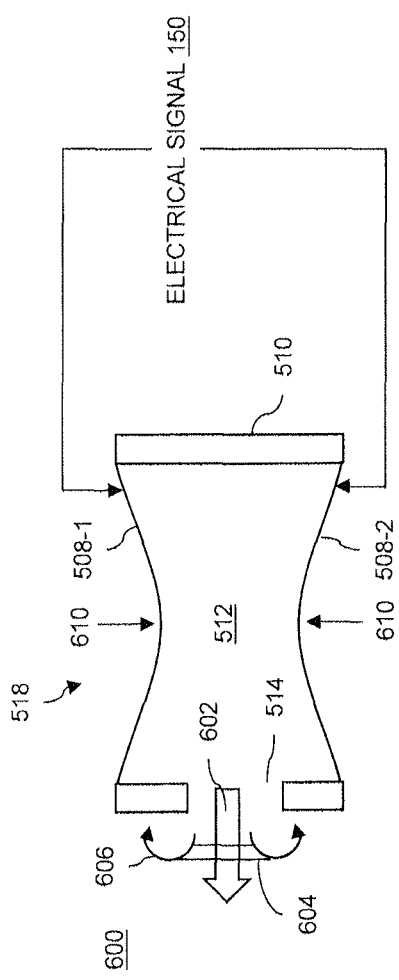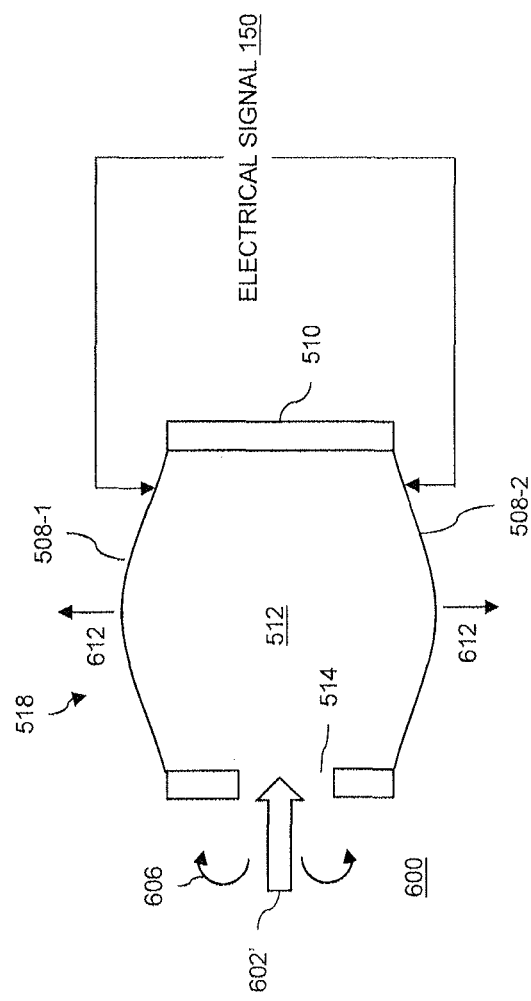

ACTIVE MODULAR AERODYNAMIC DRAG REDUCTION SYSTEM

CROSS REFERENCE TO RELATED APPLICATIONS

This application is the U.S. National Phase Application of PCT/US2014/016809, filed Feb. 18, 2014, which claims the benefit of U.S. Provisional Application No. 61/766,193 entitled ACTIVE MODULAR AERODYNAMIC DRAG REDUCTION SYSTEM, filed on Feb. 19, 2013, the content of which is incorporated herein by reference.

FIELD OF THE INVENTION

The present invention relates to the control of airflow for ground vehicles, more specifically to airflow control systems and methods using synthetic jet actuators to reduce aerodynamic drag of moving ground vehicles.

BACKGROUND OF THE INVENTION

Various solutions exist for improving the aerodynamic properties of moving bluff-shaped ground vehicles (i.e., non-streamlined shaped vehicles such as cars, trains, trucks, land-carried intermodal containers, etc.). When the ground vehicle travels, the bluff-shaped body may produce considerable aerodynamic resistance. Typically, a region of separated airflow occurs over a large portion of the surface of the bluff body. This may result in a high aerodynamic drag force and a large wake region. Airflow around the vehicle typically exhibits unsteadiness, such as periodic vortex formation and shedding. To reduce the known drawbacks of the vehicle shape, airflow control systems may be used to improve the aerodynamics.

Many current aerodynamic drag reduction devices are based on modifying the form of the vehicle body, its geometry, its surfaces or the type of body material to reduce the drag force exerted on the vehicle body. Other current aerodynamic drag reduction systems use pneumatic aerodynamic control to reduce flow separation. Typically, externally supplied compressed air is used to produce an additional flow of air through blowing outlets, such as openings on the vehicle. These systems use a compressed air plenum for all of the blowing outlets. The compressed air is discharged from the blowing outlets to reduce flow separation and reduce drag. Because the systems use a compressed air plenum for all blowing outlets, the system is connected to a robust air supply resource, such as the vehicle air supply/generation system or to a mountable compressor that is independent of the vehicle. The dependency on compressed air may substantially increase the energy requirements of the system, and may increase the size and/or weight of the system at the expense of the carrying capacity of the vehicle.

SUMMARY OF THE INVENTION

One aspect of the present invention relates to a system for airflow control of a moving ground vehicle. The system includes an actuator module mounted on the vehicle, a sensor unit mounted on the vehicle and a controller. The actuator unit includes at least one synthetic jet actuator configured to generate a synthetic jet, to modify an airflow around the vehicle. The sensor unit includes at least one environment sensor configured to capture environmental sensor data proximate the vehicle. The controller is configured to receive the environmental sensor data from the sensor unit and to determine at least one of a drive frequency and a drive amplitude for controlling the at least one synthetic jet actuator, based on the received environmental data.

Another aspect of the present invention relates to a method for airflow control of a moving ground vehicle. The method includes capturing environmental sensor data proximate the vehicle from an environmental sensor mounted on the vehicle; determining, by a controller, at least one of a drive frequency and a drive amplitude for controlling at least one synthetic jet actuator mounted on the vehicle, based on the received environmental data; and generating a synthetic jet by the at least one synthetic jet actuator based on the at least one of the drive frequency and the drive amplitude, to modify an airflow around the vehicle.

BRIEF DESCRIPTION OF THE DRAWINGS

The invention may be understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover, in the drawings, common numerical references are used to represent like features/elements. Included in the drawing are the following figures:

FIGS. 3A, 3B and 3C are top view diagrams of a portion of the tractor shown in FIG. 2A, illustrating airflow control with the jet angle-controlling fairing device shown in FIG. 2A when the tractor is not connected to a trailer and when the tractor is connected to a trailer, respectively, according to embodiments of the invention;

FIG. 4B is a perspective view diagram of an inset portion of the trailer shown in FIG. 4A, illustrating exemplary components of the actuator module shown in FIG. 4A, according to an embodiment of the invention;

FIGS. 6A and 6B are cross-section diagrams of a portion of the actuator shown in FIG. 5C, illustrating actuation of the actuator, according to an embodiment of the invention;

DETAILED DESCRIPTION OF THE INVENTION

Figure 1A:
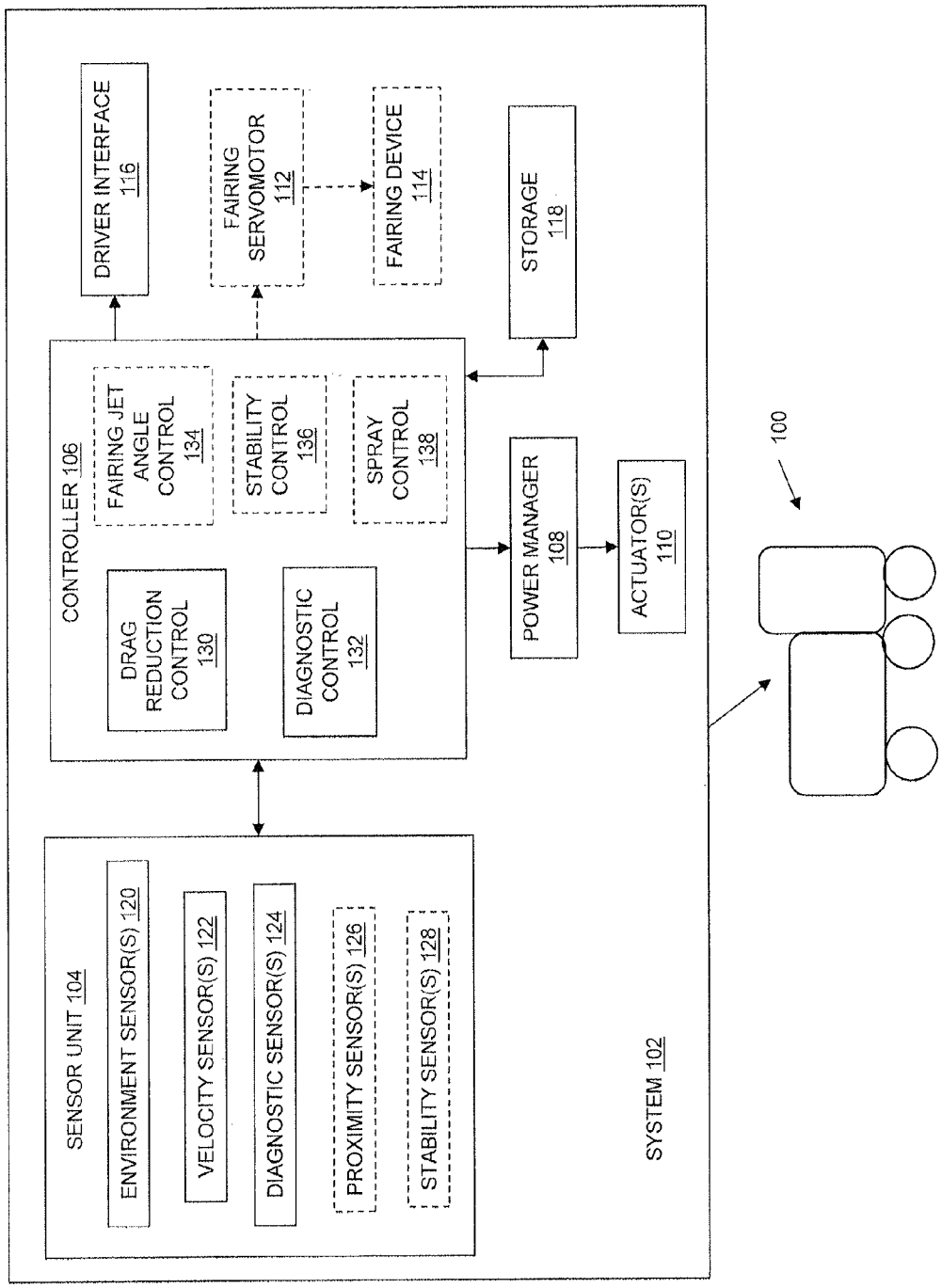
FIG. 1A is a functional block of an exemplary airflow control system for a bluff-body shaped ground vehicle, according to an embodiment of the present invention.

Aspects of the invention relate to methods and airflow control systems for reducing aerodynamic drag on a moving bluff-body shaped ground vehicle using active flow control actuators. According to an example embodiment, the system includes modular actuator components that may be removably mounted on the vehicle. The actuator components may be independent (i.e., structurally independent and mechanically independent) from the vehicle upon which they are mounted and may not require any modifications to the vehicle body.

An exemplary airflow control system may include an actuator module having at least one synthetic jet actuator, a sensor unit having at least one sensor for capturing environmental data proximate to the vehicle and a controller. The controller is configured to analyze the environmental sensor data and control operation of the actuators (including the operating voltage amplitude and the operating voltage frequency) based on the environmental sensor data. The actuator module may be an aerodynamically shaped unit and multiple actuator modules may operate independently from each other. The actuator modules may be mounted directly on the vehicle body or may be mounted on the vehicle body via a mounting frame. According to another example, the actuator modules may be integrated into the vehicle body or may be integrated in a fairing.

Exemplary synthetic jet actuators use the airflow proximate the actuator to create an oscillating flow of air (i.e., a synthetic jet), responsive to an input voltage signal via the controller. Because the actuator modules do not use an external air supply, they can be mounted at any desired location on the vehicle body. Spacing between actuator modules, the number of actuator modules and a position of each actuator module on the vehicle body may be altered. Thus, the airflow control system may be adaptable to a wide range of ground vehicles. Because the actuator modules may be replaceable (i.e., removably coupled to the vehicle body) and are mounted to the vehicle body (as opposed to being part of the vehicle body), the actuator modules may be easily replaced in case of mechanical failure. The ability to change the number and location of the actuator modules also allows the airflow control system to be tailored to the user's specific needs (and thus allows more control over where and how much aerodynamic drag reduction is provided).

In contrast, current aerodynamic drag reduction systems having active flow control techniques use externally supplied compressed air. The current systems are also integrated into the vehicle body and are built around a centralized shaft. The flow is generated through openings in the main air supply shaft in such a way that the components of the system depend and affect each other. Due to this dependence, the entire system operates as one large and complex object with limited flexibility in its installation and limited configurability. This lack of flexibility and dependence on the vehicle body for the air supply may reduce the system's energy efficiency, increase its manufacturing complexity and limits the system's applicability to a wide range of moving bodies.

Referring to FIG. 1A, a functional block diagram of an example airflow control system 102 mounted on vehicle 100 is shown. System 102 may include sensor unit 104, controller 106, power manager 108, one or more actuators 110, driver interface 116 and storage 118. System 102 may optionally include one or more of fairing servomotor 112 and jet angle-controlling fairing device 114.

Vehicle 100 may include any bluff-shaped ground vehicle (i.e., any vehicle that is not an air vehicle). Vehicle 100 may include, without being limited to, cars, trains, trucks, land-carried intermodal containers, etc. Trucks may include a tractor or a tractor with one or more trailers (such as a tandem trailer).

Sensor unit 104 may include one or more environment sensors 120 and one or more velocity sensors 122 to collect sensor data proximate vehicle 100. Environment sensor 120 may include, for example, without being limited to, a temperature sensor, a humidity sensor or a rain sensor. Velocity sensor 122 may include, without being limited to, a speedometer or a relative wind speed sensor. More than one environment sensor 120 and/or velocity sensor 122 may be positioned on vehicle 100.

Sensor unit 104 may also include one or more diagnostic sensors 124, such as, without being limited to, current detectors and/or strain gauges to identify electrical problems (such as short circuits) and/or mechanical problems with actuators 110. Identified electrical and/or mechanical problems of actuators may be communicated to the driver via driver interface 116. In some examples, the identified problems may cause system 102 to cease operation. In other examples, the identified problems may be automatically corrected (or at least an automatic attempt to correct the problems may be made) during operation of system 102.

Sensor unit 104 may also, optionally, include one or more proximity sensor 126 and/or one or more stability sensors 128 (for example, such as center of gravity sensor, a weight sensor or an accelerometer). For example, if vehicle 100 is a tractor trailer, proximity sensor(s) 126 may be used to determine a proximity of the trailer to the tractor. As another example, if vehicle 100 includes more than one trailer, proximity sensor(s) 126 may determine a proximity between the trailers. Stability sensor(s) 128 may be used to determine whether movement of the trailer body indicates that it is becoming unstable.

Controller 106 may receive sensor data from sensor unit 104 in order to perform drag reduction control 130 and diagnostic control. The received sensor data may also be used to perform optional fairing jet angle control 134, optional stability control 136 and/or optional spray control 138.

Controller 106 may be configured to control operation of one or more sensor unit 104, power manager 108, actuators 110, optional fairing servomotor 112, optional fairing device 114 and driver interface 116. Controller 106 may include, for example, a logic circuit, a digital signal processor, a microcontroller or a microprocessor.

Controller 106 may be configured to perform drag reduction control 130, to control the operating frequency and operating voltage amplitude of the electrical signal provided to actuators 110, based on the environmental conditions proximate vehicle 100. To determine the environmental conditions, controller 106 may use the sensor data received from environment sensors 120, as well as sensor data from velocity sensor 122. The operating frequency and voltage amplitude may be determined according to a predetermined relationship between environmental conditions, relative flow-vehicle velocity and optimal actuator voltage and frequency.

Drag reduction control 130 may be performed when vehicle 100 is moving above a predetermined velocity threshold. To identify the velocity of vehicle 100, controller 106 may use the sensor data received from velocity sensor 122. A description of drag reduction control 130 is provided further below with respect to FIG. 8.

Controller 106 may also be configured to perform diagnostic control 132, to determine whether components of system 102 are operating under normal conditions. For diagnostic control 132, controller 106 compares sensor data received from diagnostic sensors 124 to predetermine conditions, to identify electrical and/or mechanical problems with components of system 102 or to confirm that system 102 is operating under normal conditions. Depending upon the operating conditions, controller 106 may provide an indication of a normal or faulty condition to driver interface 116. Diagnostic control 132 is described further below with respect to FIG. 9.

Controller 106 may be configured to perform optional fairing jet angle control 134 (when system 102 includes optional jet angle-controlling fairing device 114). As described further below in FIGS. 3A and 3B, fairing device 114 may be pivotably attached to vehicle 100 and may have one or more actuators 110 mounted thereon. The position of fairing device 114 may be changed, for example, based on whether a trailer is attached to a tractor. Changing the position of fairing device 114 changes a jet angle of the synthetic jet (described further below with respect to FIGS. 6A and 6B) that is output by actuators 110. The position of fairing device 114 may be changed manually. According to another embodiment, system 102 may include optional fairing servomotor 112, to automatically change the position of fairing device 114, based on fairing jet angle control 134. Fairing jet angle control 134 is described further below with respect to FIG. 10.

Controller 106 may be configured to perform optional stability control 136. Stability control 136 may be useful, for example, to monitor and adjust movement of a trailer attached to vehicle 100 (such as when the trailer is moving in an unstable manner). In stability control 136, controller 106 may receive stability sensor data from stability sensors 128, and may determine whether movement of vehicle 100 is according to a predetermined stable condition. If controller 106 determines that vehicle 100 is not moving in a stable condition, controller 106 may send a control signal to power manager 108 to activate one or more actuators 110 to produce a stabilizing net force on vehicle 100. Stability control 136 is described further below with respect to FIG. 11.

Controller 106 may be configured to perform optional spray control 138. For spray control 138, controller 106 may receive sensor data from environment sensors 120 (such as a rain sensor), to determine whether rain is detected. When controller 106 detects rain, controller 106 may send a control signal to power manager 108 to control one or more actuators 110. The selected actuators 110 may produce synthetic jets to redirect rain away from vehicle 100 and/or to redirect the spray away from its exposure by other vehicles that are behind or next to vehicle 100. Spray control 138 is described further below with respect to FIGS. 12A and 12B.

Driver interface 116 may include any suitable interface to provide visual and/or audio indication of a normal or faulty operating condition. Driver interface 116 may be provided in a vehicle cabin of vehicle 100, for the driver's convenience. As another example, driver interface 116 may be provided on controller 106 and/or power manager 108. For example, driver interface 116 may be an external unit mounted on a component of system 102 or may be formed as part of a component of system 102. Responsive to the indication on driver interface 116, the driver may operate vehicle 100 or may have system 102 inspected for maintenance issues.

System 102 may include storage 118. Storage 118 may store one or more values for sensor unit 104, controller 106, power manager 108, actuators 110, fairing servomotor 112, fairing device 114 and/or driver interface 116. Storage 118 may include, for example, a random access memory (RAM), a magnetic disk, an optical disc, flash memory or a hard drive.

Power manager 108 may be configured to receive control signals from controller 106 and activate one or more actuators 110 according to operation parameters (frequency and voltage amplitude) provided by controller 106 in the control signal. Power manager 108 is described further below with respect to FIG. 1B.

Each actuator 110 may be configured to receive an electrical signal (having an operation frequency and an operation voltage amplitude) from power manager 108 and may produce a synthetic jet. The synthetic jets produced by actuators 110 may be used to control the airflow around vehicle 100. The synthetic jets of actuators 110 may also be used to provide optional stability control of vehicle 100 and/or optional spray control under rain conditions. Actuators 110 may be mounted directly to vehicle 100 or may be mounted to vehicle 100 via a mounting frame, such as mounting frame 208 shown in FIG. 2B. As another example, actuators 110 may be formed integral with the vehicle body and/or integral with fairing device 114. Actuators 110 are described further below with respect to FIGS. 5A-5C and FIGS. 6A and 6B.

It is understood that components of one or more of sensor unit 104, controller 106, power manager 108, driver interface 116 and storage 118 may be implemented in hardware, software or a combination of hardware and software.

Figure 1B:
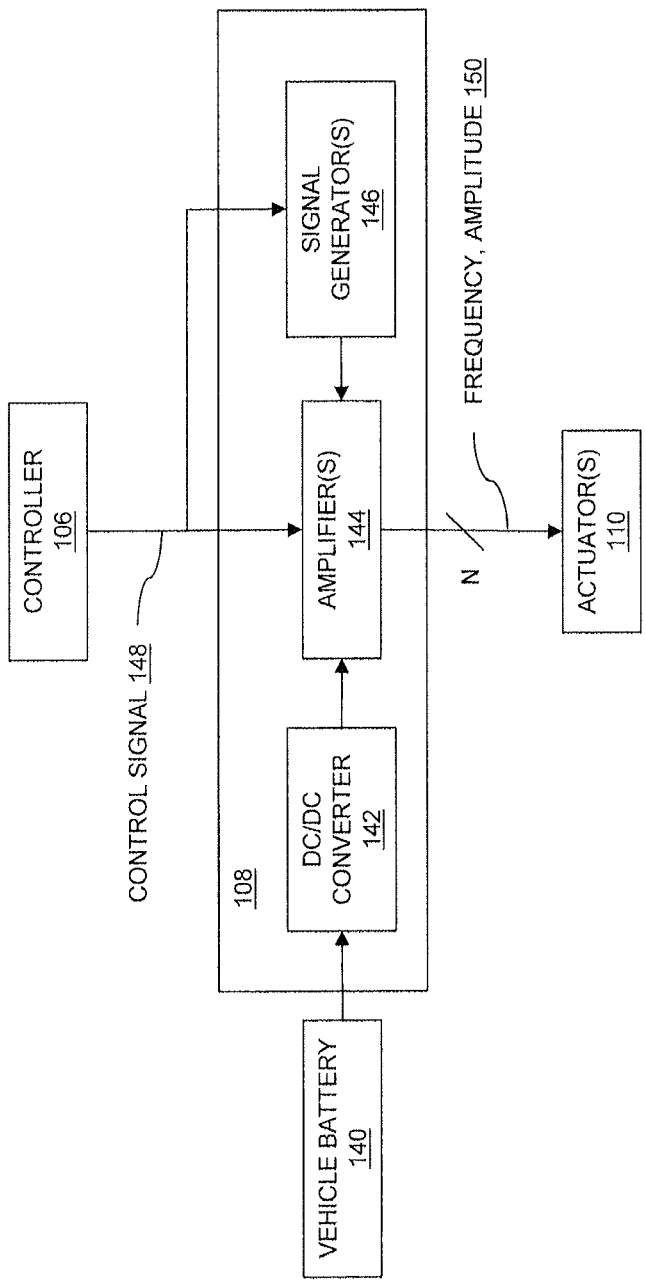
FIG. 1B is a functional block diagram of the power manager shown in FIG. 1A, according to an embodiment of the present invention.

Referring to FIG. 1B, a functional block diagram of an exemplary power manager 108 is shown. Power manager 108 may include direct current (DC)/DC converter 142, one or more amplifiers 144 and one or more signal generators 146. DC/DC converter 142 may receive a voltage signal from vehicle battery 140 and convert the voltage to a voltage range suitable for actuators 110 (as well as being suitable for amplifier(s) 144). Power manager 108 may also receive control signal 148 from controller 106 indicating an operation frequency and operation voltage amplitude for actuators 110. In FIG. 1B, N number of electrical signals 150 (where N is an integer greater than or equal to 1) having the frequency and voltage amplitude indicated by control signal 148 are supplied to actuators 110. The N number of electrical signals 150 may correspond to N number of actuators 110 or may correspond to groups of actuators (such as actuators arranged in different actuator modules 202 (shown in FIG. 2A). Each actuator in the group may receive the same electrical signal. Thus, different electrical signals 150 may be provided to different groups of actuators (i.e., different actuator modules 202).

The control signal 148 from controller 106 may also indicate specific actuators 110 for activation with the corresponding operation parameters. Responsive to the control signal, signal generators 146 may generate a voltage signal having an oscillation frequency corresponding to the operation frequency received in control signal 148. Amplifiers 144 may amplify the generated signal from signal generator 146 according to the voltage amplitude received in control signal 148 from controller 106. Power manager 108 may send a generated electrical signal 150 with the operation frequency and voltage amplitude to selected actuators 110.

Figure 2A:
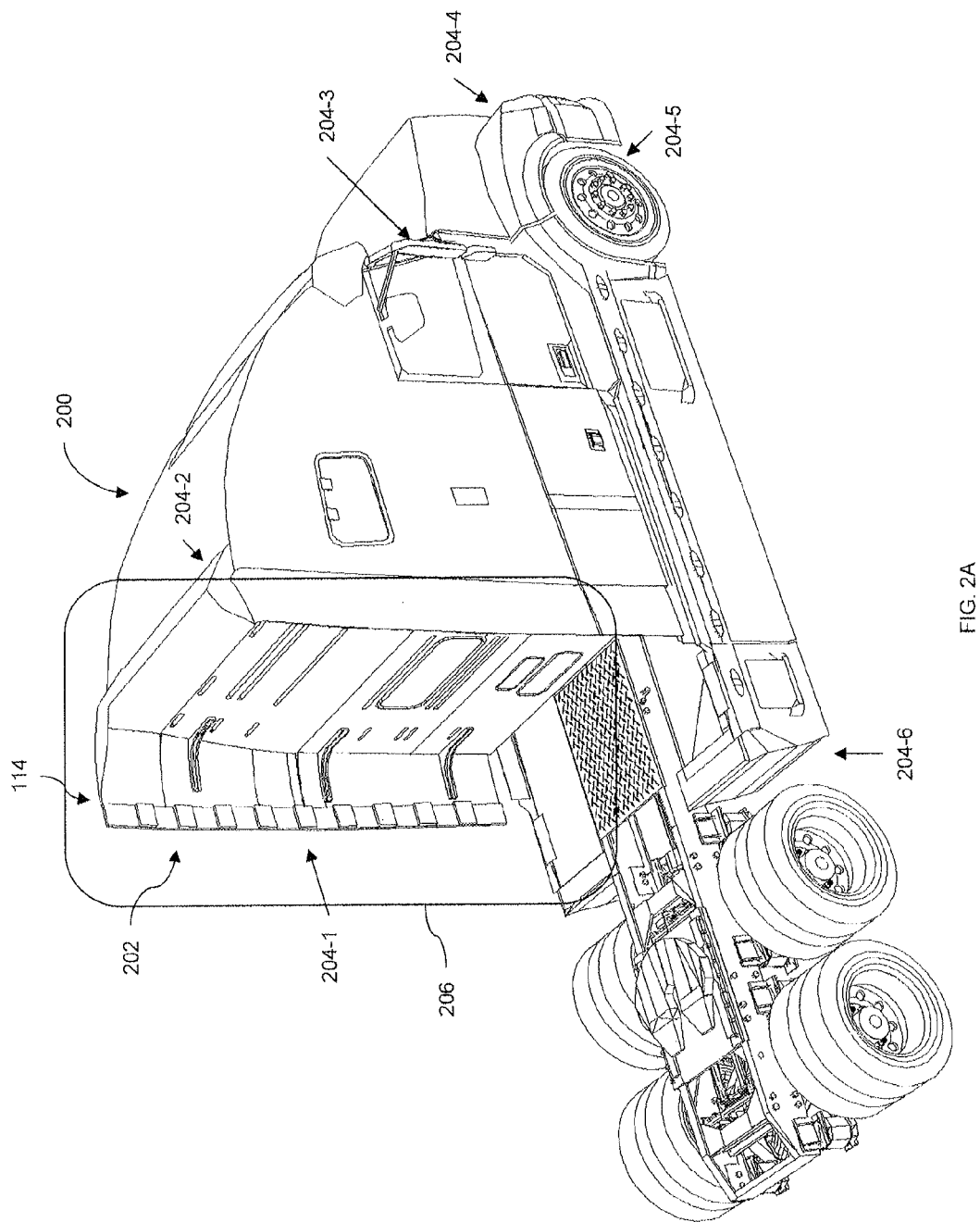
FIG. 2A is a perspective view diagram of a tractor including an exemplary actuator module and jet-angle controlling fairing device, according to an embodiment of the invention.
Figure 2B:
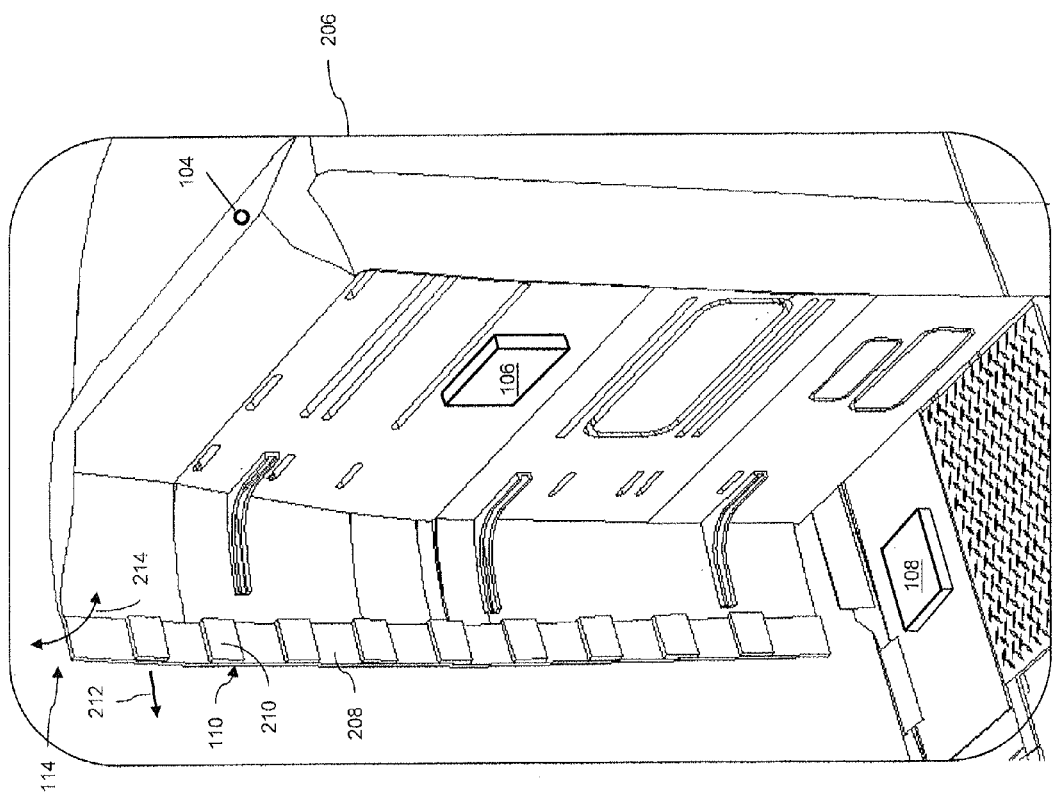
FIG. 2B is a perspective view diagram of an inset portion of the tractor shown in FIG. 2A, according to an embodiment of the present invention.

Referring next to FIGS. 2A and 2B, perspective view diagrams of an example system 102 mounted on vehicle 200 is shown. In particular, FIG. 2A is a perspective view diagram of tractor 200 and FIG. 2B is a perspective view diagram of inset 206 of FIG. 2A.

In FIGS. 2A and 2B, a plurality of actuators 110 are disposed in actuator module 202. In the example, actuator module 202 is mounted on fairing device 114. As shown in FIG. 2B, fairing device 114 is pivotable, as illustrated by arrow 214. FIG. 2B also illustrates example placement of sensor unit 104, controller 106 and power manager 108 on tractor 200.

Although FIG. 2A illustrates one actuator module 202 disposed on fairing device 114, at position 204-1, actuator module 202 may be mounted at any other suitable positions on tractor 200. Accordingly, FIG. 2A also illustrates other example positions for actuator module 202 (and/or individual actuators 110) on tractor 200. For example, actuator module 202 (or actuator 110) may be mounted at position 204-2 (on the roof), position 204-3 (on the mirror), position 204-4 (on the front skirt), position 204-5 (on the front wheel) and/or position 204-6 (on the tractor back wheel). The positions shown in FIG. 2A are examples. It is understood that actuator module 202 and/or actuators 110 may be positioned at any other suitable location on tractor 200.

Actuators 100 may be disposed in housing 210 on mounting frame 208. Housing 210 may be configured in any geometry and/or formed of any suitable materials to reduce drag force exerted on actuator module 202. Although not shown in FIG. 2B, mounting frame 208 may include an electrical conduit (such as electrical conduit 410 shown in FIG. 4B), to electrically connect actuators 110 to power manager 108. As shown in FIG. 2B, actuators 110 generate synthetic jets 212 which may be used to control the airflow and reduce aerodynamic drag on tractor 200.

Referring next to FIGS. 3A-3C, positioning of fairing device 114 to control the synthetic jet angle of actuators 110 (on actuator module 202 shown in FIGS. 2A and 2B) is described. In particular, FIG. 3A illustrates fairing device 114 in a first position when no trailer is attached to tractor 200; FIG. 3B illustrates fairing device 114 in a second position when a trailer is attached to tractor 200; and FIG. 3C illustrates fairing device 114 in another example position when a trailer is attached to tractor 200. As shown in FIG. 3A, positioning fairing device 114 inwards towards a trailer gap (between tractor 200 and a front surface of a trailer, such as trailer 400 shown in FIG. 4A) produces synthetic jets 212 at an angle 301 (with respect to the horizontal direction). When synthetic jets 212 are positioned at the angle 301 shown in FIG. 3A, this causes airflow 300 around tractor 200 to be pulled toward the center of the tractor gap (as airflow 302).

As shown in FIG. 3B, when fairing device 114 is positioned away from the tractor gap (parallel to the horizontal direction), synthetic jets 212 cause airflow 300 to be directed parallel to the horizontal direction (as airflow 304). Airflow 304 may reduce aerodynamic drag on a trailer portion attached to tractor 200 (not shown).

FIGS. 3A and 3B illustrate two example positions of fairing device 114. Fairing device 114 may also be positioned as shown in FIG. 3C, at an outward angle 303 relative to the horizontal direction. When fairing device 114 is positioned at outward angle 303, synthetic jets 212 cause airflow 300 to be directed away from the trailer gap (as airflow 306).

Figure 4A:
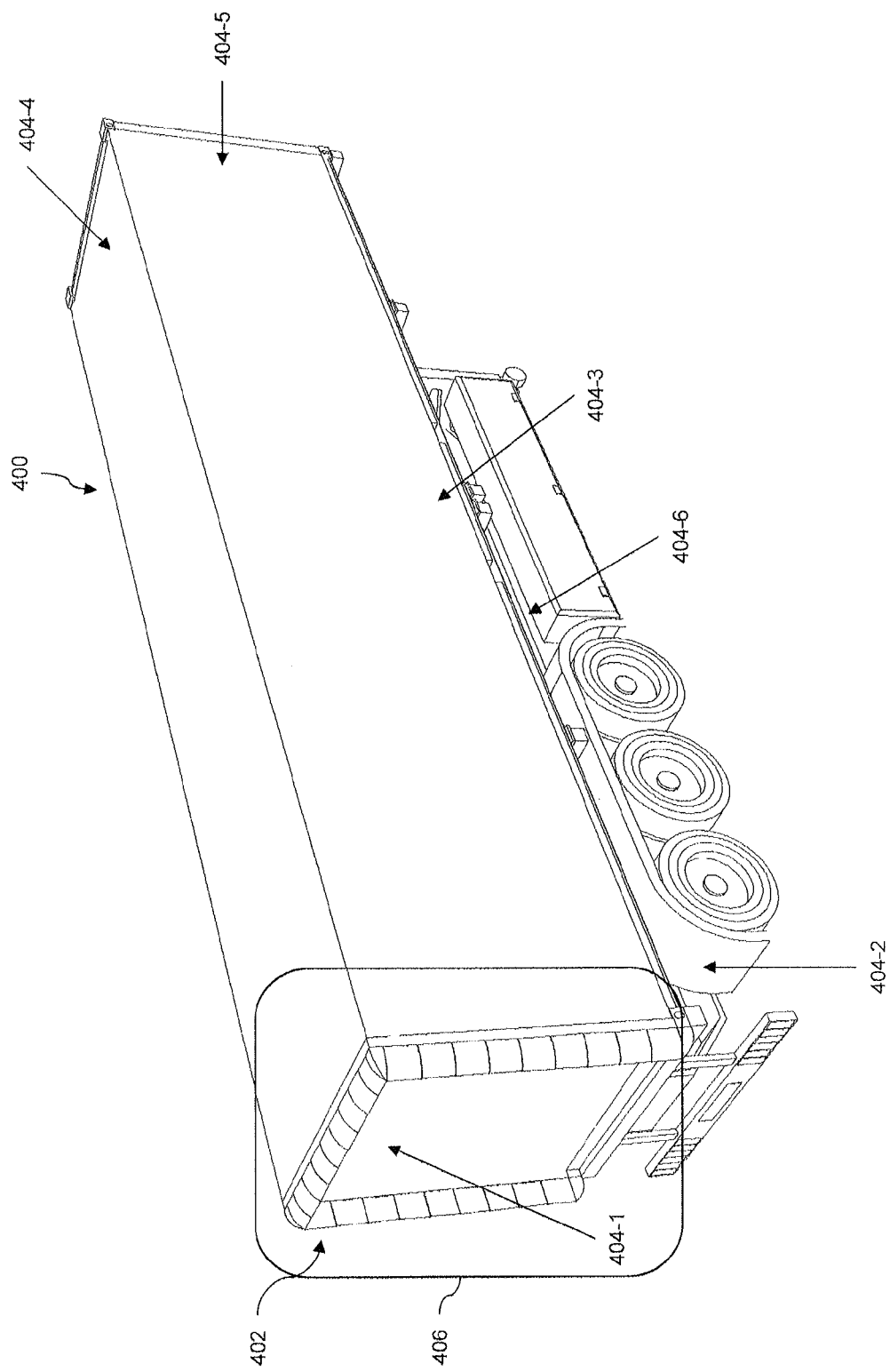
FIG. 4A is a perspective view diagram of a trailer including an exemplary actuator module positioned on the trailer, according to an embodiment of the invention.

Referring to FIGS. 4A and 4B, an example of system 102 as mounted on trailer 400 is shown. In particular, FIG. 4A is a perspective view diagram of trailer 400 including system 102; and FIG. 4B is a perspective view diagram of inset 406 of FIG. 4A. FIG. 4B also illustrates example placement of sensor unit 104 and controller 106 on trailer 400. Power manager 108 may be disposed in another location, such as the location shown in FIG. 2B.

In FIGS. 4A and 4B, actuators 110 are disposed in actuator module 402 positioned at location 404-1 on the rear of trailer 400. Location 404-1 represents one example position for actuator module 402. Actuator module 402 (or individual actuators 110) may also be positioned at other locations such as, without being limited to, location 404-2 (at the trailer back wheel), location 404-3 (on a side of the trailer), location 404-4 (on a roof of trailer 400), location 404-5 (at a front of trailer 400) and location 404-6 (at a bottom of trailer 400).

As shown in FIG. 4B, actuator module 402 may include mounting frame 408 having electrical conduit 410. Electrical conduit 410 may electrically couple actuators 110 to power manager 108. Actuator module 402 may also include housing 412 in which actuators 110 are disposed. Actuators 110 may produce synthetic jets 212 in accordance with their positioning in housing 412. Similar to housing 210 (FIG. 2B), housing 412 may be formed of any suitable geometry and/or any suitable material to reduce a drag force exerted on actuator module 402.

Figure 5C:
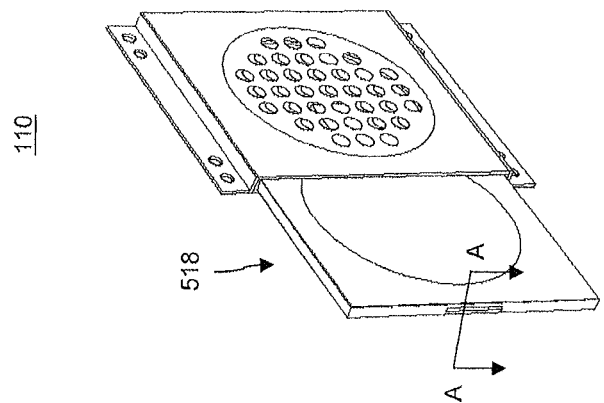
FIGS. 5B and 5C are perspective view diagrams of the actuator shown in FIG. 5A, according to an embodiment of the invention.
Figure 5B:
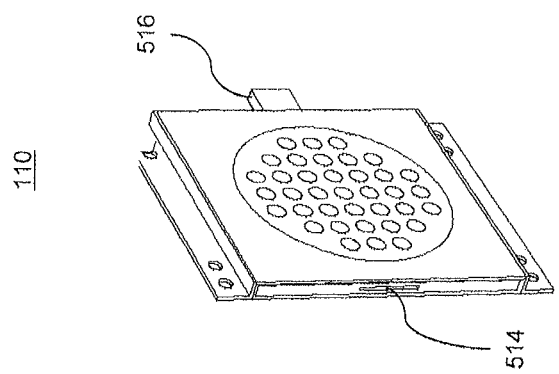
Figure 5A:
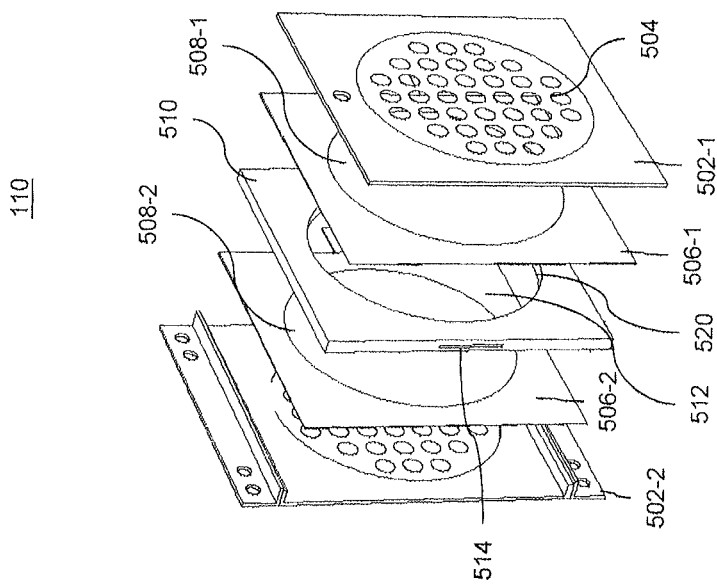
FIG. 5A is an exploded perspective view diagram of an exemplary actuator, according to an embodiment of the invention.

Referring to FIGS. 5A-5C, an example of actuator 110 is shown. In particular, FIG. 5A is an en exploded perspective view diagram of actuator 110; and FIGS. 5B and 5C are perspective view diagrams of actuator 110.

Actuator 110 is a synthetic jet actuator including outer frame 502-1, 502-2 enclosing actuator cartridge 518. As shown in FIG. 5C, actuator cartridge 518 may be slidably disposed within outer frame 502, for easy access and interchangeability (such as when a problem is detected with a specific actuator 110). Actuator cartridge 518 may include electrical connector 516 for receiving electrical signal 150 (FIG. 1B) from power manager 108.

Actuator cartridge 518 includes housing 510 having cavity 512 (formed by side wall 520). The housing 510 and cavity 512 may take any suitable geometric configuration, including the configuration shown in FIG. 5A. Housing 510 also includes jet orifice 514. Housing 510 may be mechanically coupled to plates 506-1, 506-2, each having respective piezoelectric discs 508-1, 508-2. Piezoelectric disc 508-1, side wall 520 and piezoelectric disc 508-2 may define cavity 512 filled with a fluid (such as air). Cavity 512 may be configured to be in fluid communication with jet orifice 514. Jet orifice 514 may be formed of any suitable geometric shape.

Each piezoelectric disc 508 may include a piezoelectric material and may be electrically connected to power manager 108 (FIG. 1B). Power manager 108 may be configured to apply an excitation voltage to each piezoelectric disc 508-1, 508-2, to displace each piezoelectric disc. The excitation voltage applied to piezoelectric discs 508-1, 508-2 may be an oscillating signal having an oscillation frequency and an amplitude (selected by controller 106 according to the environmental conditions and relative velocity). Thus, piezoelectric discs 508 may be periodically displaced inwardly and outwardly relative to cavity 512, and force fluid in and out of jet orifice 514.

Outer frame 502 may include perforated sheet 504. Perforated sheet 504 may permit movement of piezoelectric disc 508 within outer frame 502, while reducing fluid loading on piezoelectric disc 508 (external to actuator cartridge 518). For example, by allowing piezoelectric disc 508 and outer frame 502 to be in fluid communication with ambient fluid through perforated sheet 504, fluid external to actuator cartridge 518 may be more easily displaced by piezoelectric disc 508 into the ambient environment.

Although FIGS. 5A-5C illustrate actuator 110 having two piezoelectric discs 508-1, 508-2, actuator 110 may also be configured with one piezoelectric disc 508. For example, only plate 506-1 may include piezoelectric disc 508-1. Plate 506-2 may not include a piezoelectric plate, but, rather, may be a rigid structure. The excitation voltage applied to piezoelectric disc 508-1 may cause piezoelectric disc 508 to be periodically displaced, to force fluid in and out of jet orifice 514.

Referring to FIGS. 6A and 6B, cross-section diagrams of actuator cartridge 518 along line A-A (FIG. 5C) are shown, illustrating operation of actuator cartridge 518 (to form synthetic jet 602). FIG. 6A depicts actuator cartridge 518 as piezoelectric discs 508-1, 508-2 are controlled (by electrical signal 150) to move inward into cavity 512, as depicted by arrows 610. Cavity 512 has its volume decreased and fluid is ejected through the jet orifice 514. As the fluid exits cavity 512 through jet orifice 514, the flow separates at the edges of jet orifice 514 and creates vortex sheets 604 which roll into vortices 606 and begin to move away from jet orifice 514, to form synthetic jet 602.

FIG. 6B depicts actuator cartridge 518 as piezoelectric discs 508-1, 508-2 are controlled (by electrical signal 150) to move outward with respect to cavity 512, as depicted by arrow 612. Cavity 512 has its volume increased and ambient fluid 600 rushes into cavity 512. When piezoelectric discs 508-1, 508-2 move away from cavity 512, vortices 606 are already removed from the jet orifice edge and thus are not affected by ambient fluid 600 being drawn into cavity 512. In addition, a jet of ambient fluid 602' is synthesized by vortices 606 creating strong entrainment of ambient fluid 600 drawn from large distances away from jet orifice 514.

Referring generally to FIGS. 5A-5C and FIGS. 6A and 6B, actuators 110 may actively use the moving air (ambient air 600) around the vehicle body to generate a controlled pulsating flow of air (synthetic jet 602). Synthetic jet 602 may be used to manipulate the boundary layer around the body. Actuators 110 operate under electrically power (by electrical signal 150), without any additional air supply source. Instead, actuators 110 use the ambient air 600 to generate the pulsating flow of air (by unsteady suction of blow of the air via cavity 512).

In actuators 110, an isolated synthetic jet is produced by the interacts of a train of vortices 606 that are typically formed by alternating momentary ejection and suction of fluid across jet orifice 514, such that the net mass flux is zero. Because synthetic jet 602 is formed entirely from the working fluid 600, actuators 110 can transfer linear momentum to the flow system without net mass injection across the flow boundary.

Actuators 110 may produce synthetic jet 602 over a broad range of length and time scales. For example, a length scale of actuator 110 may be between about 6 mm by 1 mm to about 100 mm by 5 mm (for a rectangular jet orifice 514) and between about 1 mm diameter to about 20 mm diameter (for a circular jet orifice 514). The time scale may be, for example, from about $1/3000$ second to about $1/10$ second. The interaction of synthetic jets 602 with an external cross flow over the surface upon which actuators 110 are mounted may be used to displace local streamlines (as shown in FIGS. 7A and 7B) and induce an apparent or virtual change in the shape of the surface. In one example, synthetic jets 602 may affect flow changes on length scales that are one to two orders of magnitude larger than the characteristic scale of synthetic jets 602.

It is desirable that the actuation frequency be high enough so that the interaction domain between actuator 110 and the cross flow is substantially invariant on a global time scale of the flow, such that global effects such as changes in aerodynamic forces are effectively decoupled from the operating frequency of actuators 110. For example, the actuation frequency may include, without being limited to, between about 10 Hz to about 2 kHz. The voltage range may include, without being limited to about 10 V to about 500 V.

Figure 7C:
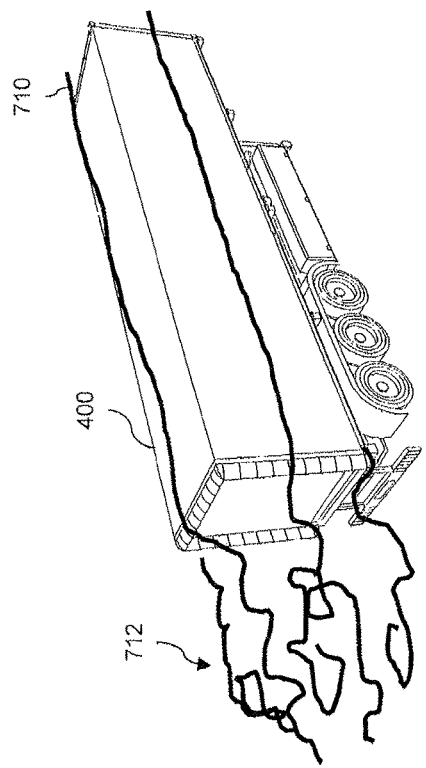
FIGS. 7C and 7D are perspective view diagrams of a trailer and the resultant airflow at the back of the trailer without operation of an exemplary airflow control system and with operation of the airflow control system, respectively, according to embodiments of the invention.
Figure 7D:
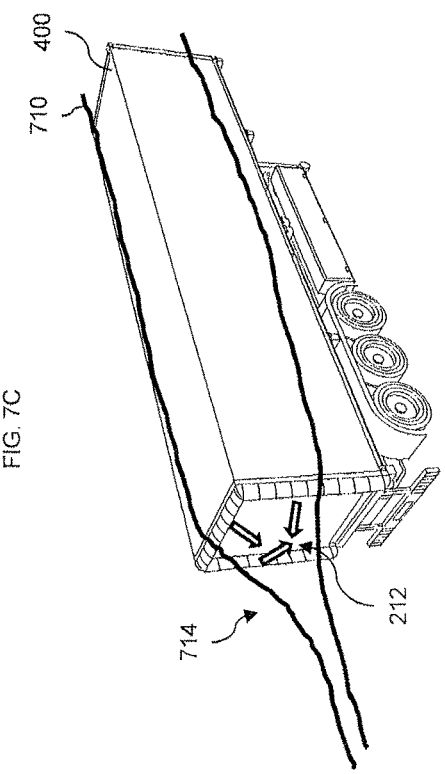
Figure 7A:
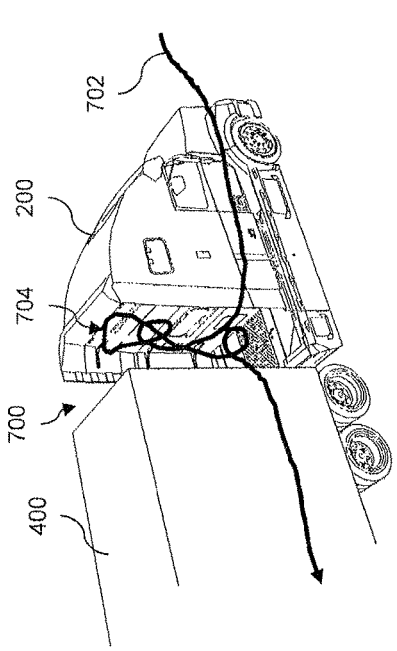
FIGS. 7A and 7B are perspective view diagrams of a tractor coupled to a trailer and the resultant airflow in the tractor gap without operation of an exemplary airflow control system and with operation of the airflow control system, respectively, according to embodiments of the invention.
Figure 7B:
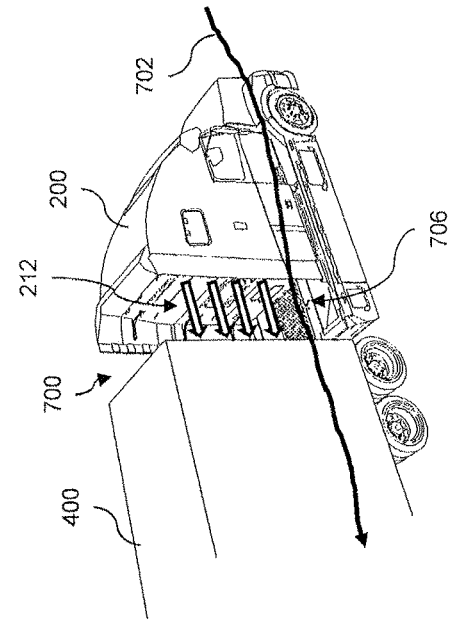

Referring to FIGS. 7A-7D, examples of synthetic jet actuation effects on airflow around tractor 200 and trailer 400 are shown. In particular, FIG. 7A is a perspective view diagram of tractor 200 coupled to trailer 400 and airflow 704 in tractor gap 700 without operation of airflow control system 102; FIG. 7B is a perspective view diagram of tractor 200 coupled to trailer 400 and airflow 706 in tractor gap 700 with operation of airflow control system 102; FIG. 7C is a perspective view diagram of trailer 400 and airflow 712 behind trailer 400 without operation of airflow control system 102; and FIG. 7D is a perspective view diagram of trailer 400 and airflow 714 behind trailer 400 with operation of airflow control system 102.

As shown in FIG. 7A, airflow 702 is directed around tractor 200 and enters tractor gap 700. Within tractor gap 700, airflow 704 is created, which exhibits unsteadiness and may contribute to increased aerodynamic drag. As shown in FIG. 7B, when synthetic jets 212 are activated, the local streamlines in tractor gap 700 are displaced and are redirected as airflow 706 (with decreased unsteadiness).

As shown in FIG. 7C, airflow 710 is directed around trailer 400 and exits behind trailer 700. Behind trailer 400, airflow 712 is created, which exhibits unsteadiness and may contribute to increased aerodynamic drag. As shown in FIG. 7D, when synthetic jets 212 are activated, the local streamlines behind trailer 400 are displaced and are redirected as airflow 714 (with decreased unsteadiness).

Figure 8:
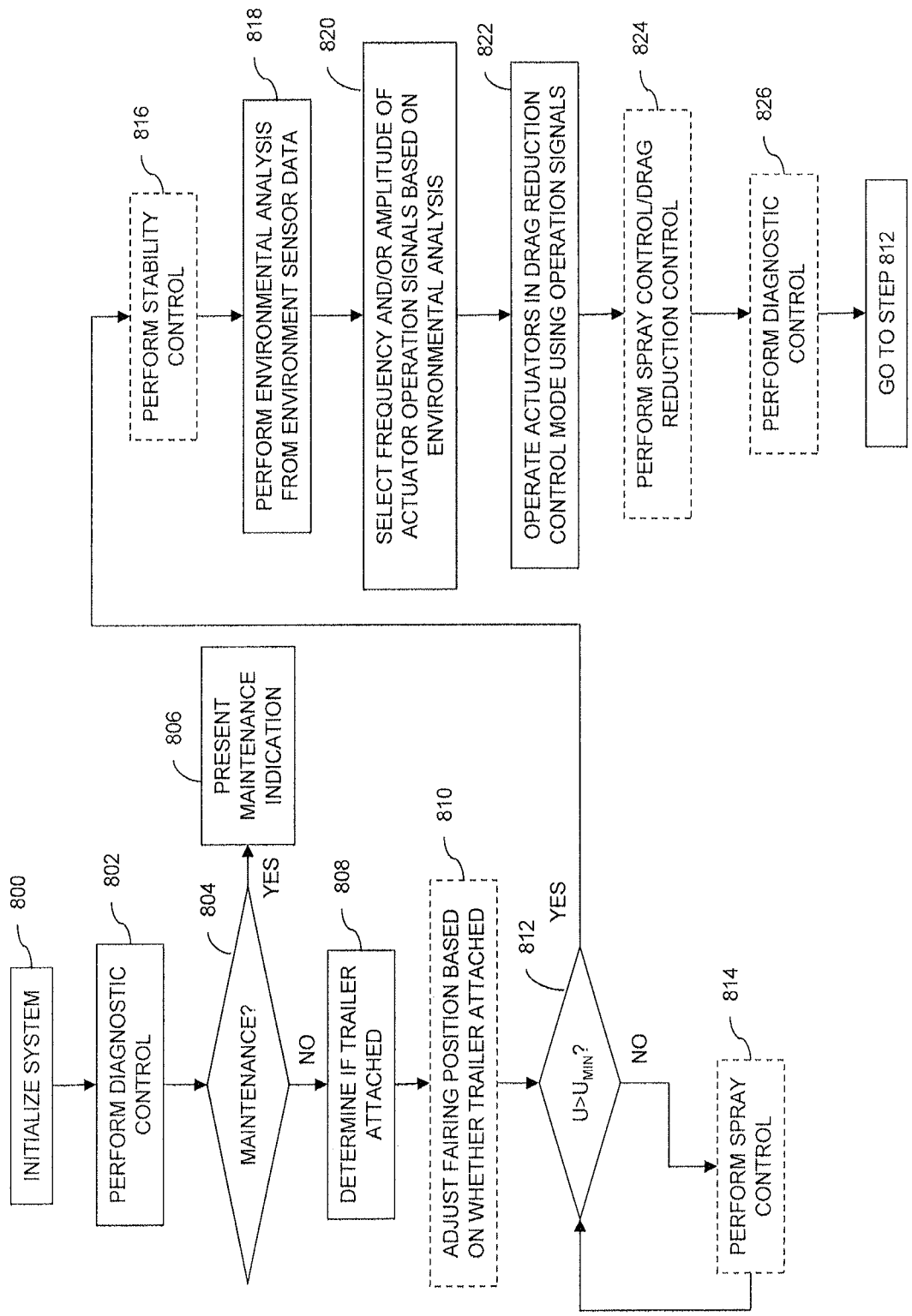
FIG. 8 is a flow chart illustrating an exemplary method of controlling airflow of a bluff-body shaped vehicle, according to an embodiment of the invention.

Referring to FIG. 8 (and to FIG. 1A), a flow chart is shown of an example method of controlling airflow of a bluff-body shaped vehicle. At step 800, components of system 102 are initialized. For example, controller 106 may initiate collection of sensor data from sensor unit 104, may initiate power manager 108 and/or may send an indication to driver interface 116 that system 102 is in operation.

At step 802, controller 106 may perform diagnostic control of components of system 102, to identify any problems that may require maintenance. At step 804, it is determined whether maintenance is necessary (based on step 802).

When it is determined, at step 804, that maintenance is necessary, step 804 proceeds to step 806. At step 806, a maintenance indication is presented to the driver, for example, via driver interface 116. Although, in step 806, a maintenance indication is presented, airflow control system 102 may continue to operate. Accordingly, in some examples, step 806 may proceed to step 808. According to other examples, step 806 may also include terminating operation of system 102. Examples of diagnostic control (step 802) is described further below with respect to FIG. 9.

When it is determined, at step 804, that maintenance is unnecessary, step 804 proceeds to step 808. At step 808, it is determined whether a trailer is attached to the vehicle 100. A trailer indication may be stored (for example, in storage 118) if it is determined that a trailer is attached. Actuator 110 selection and/or the operational signal supplied to actuators 110 (for various control modes 130-138) may be dependent upon whether the trailer is attached.

At optional step 810, the position of fairing device 114 (if it is included with system 102) is adjusted based on the trailer indication (step 808). The position of fairing device 114 may be adjusted manually or automatically by optional fairing servomotor 112. Optional step 810 is described further below with respect to FIG. 10.

At step 812, it is determined whether the air speed (U) is greater than a predetermined velocity threshold ($U_{MIN}$). For example, controller 106 may monitor velocity sensor data from velocity sensor(s) 122. In an example embodiment, the predetermined velocity threshold is about 30 mph to about 60 mph.

When it is determined, at step 812, that the air speed is less than or equal to the predetermined threshold, step 812 proceeds to optional step 814. At optional step 814, spray control may be performed by controller 106. As described further below with respect to FIG. 12A, actuators 110 in various actuator modules (such as actuator module 202 shown in FIG. 2A or actuator module 402 shown in FIG. 4A) may be activated to redirect spray from rain away from vehicle 100 and/or to redirect spray away from other vehicles moving along the path of vehicle 100.

When it is determined, at step 812, that the air speed is greater than the predetermined threshold, step 812 proceeds to optional step 816. At optional step 816, controller 106 may perform stability control 136, to monitor and correct unstable movement of a portion of vehicle 100 (such as on trailer 400 (FIG. 4A)). Step 816 is described further below with respect to FIG. 11.

At step 818, controller 106 receives environmental sensor data (such as temperatures and/or humidity) from environmental sensor(s) 120 and performs an analysis of the current environmental conditions. At step 820, controller 106 selects an operation frequency and a voltage amplitude for the operational signals (electrical signals 150) to be applied to actuators 110 based on the environmental conditions (e.g., relative humidity and/or temperature). Controller 106 may also select the operational parameters for various actuators 110 based on whether a trailer is attached and/or the current air speed. At step 822, one or more actuators 110 are operated in drag reduction control according to the operational signals (determined in step 820).

In general, the operation frequency and amplitude for the oscillating voltage signal may be determined according to one or more predetermined relationships between relative humidity, temperature and output synthetic jet characteristics. The predetermined relationship may be based on physical characteristics of actuator 110 (such as a size and/or shape of cavity 512, material properties of piezoelectric disc 508 as well as the properties of the fluid itself). In some examples, the operation frequency and amplitude may be determined from a look up table according to the temperature and/or the relative humidity. In other examples, controller 106 may use a mathematical model that may correlate the optimal frequency and amplitude with temperature and/or relative humidity data received from environmental sensor(s) 120. In general, there is an empirical relationship between temperature/humidity and frequency/amplitude. The relationship may be a function of the piezoelectric disc material and the diameter of the piezoelectric disc 508. As another example, a temperature range between about −30° F. to about 113° F. and a relative humidity range between about 0% to about 100% may correspond with an operation frequency between about 0 Hz to about 3 kHz and an operation amplitude between about 10 V to about 500 V.

At optional step 824, controller 106 may perform spray control in combination with drag reduction control. Step 824 is described further below with respect to FIG. 12B.

Figure 9:
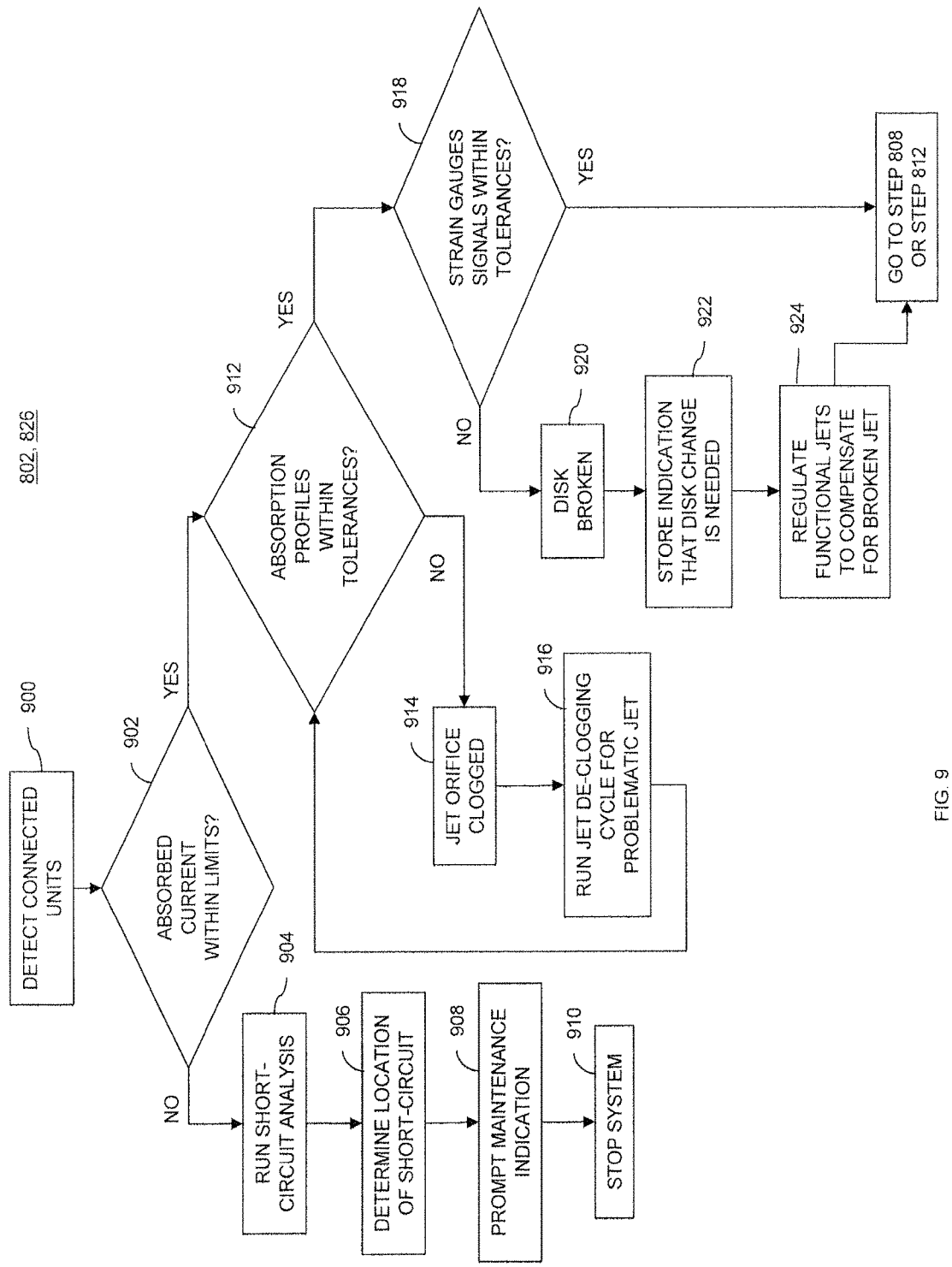
FIG. 9 is a flow chart illustrating an exemplary method of performing diagnostic control of an airflow control system, according to an embodiment of the invention.

At optional step 826, controller 106 may optionally perform diagnostic control 826, as described with respect to FIG. 9. Optional step 826 may proceed to step 812, and steps 812-optional step 826 may be repeated as long as system 102 is operational.

Referring to FIG. 9, a flow chart is shown of an example method of performing diagnostic control (step 802 and optional step 826 of FIG. 8). At step 900, connected actuators 110 are detected, for example, by one or more current detectors (an example of diagnostic sensor 124) electrically coupled to actuators 110 via an electrical conduit. At step 902, it is determined, for example, by controller 106, whether the current absorbed by actuators 110 are within predetermined current limits, based on the value of the current detector(s). For example, for a power of about 10 W to about 20 W per piezoelectric disk 508 and a voltage amplitude of about 200 V, the predetermined current limits may be between about 1.8 A to about 3.6 A (for a tractor having 36 piezoelectric discs) and between about 2.7 A to about 5.4 A (for a trailer having 54 piezoelectric discs).

When it is determined, at step 902, that the absorbed current is outside of the predetermined current limits, step 902 proceeds to step 904. At step 904, controller 106 performs a short-circuit analysis of the electrical circuit (of actuators 110) based on the sensor data from the current detector(s). At step 906, a location of a short-circuit in the electrical circuit is determined by controller 106, based on the analysis in step 904. At step 908, a maintenance indication is prompted, by controller 106. The maintenance indication may also be stored in storage 118. The stored maintenance indication may include information regarding the short-circuit condition, including the identified location of the short-circuit. The maintenance indication may also be provided to the driver (as in step 806 of FIG. 8).

At step 910, responsive to the short-circuit condition, controller 910 may terminate operation of system 102.

When it is determined, at step 902, that the absorbed current is within the predetermined current limits, step 902 proceeds to step 912. At step 912, it is determined whether current absorption profiles of actuators 110 are within predetermined tolerances. For example, controller 106, may monitor the absorption profile of actuators 110 (such as an amplitude of the profile) via one or more current detectors (an example of diagnostic sensor 124) coupled to actuators 110.

When it is determined, at step 912, that the absorption profiles are outside of the predetermined tolerances, step 912 proceeds to step 914. At step 914, an actuator 110 is identified, by controller 106, as having a clogged jet orifice 514 (FIG. 5A). At step 916, controller performs a jet de-clogging cycle for the identified actuator 110 (in step 914). For example, controller 106 may cause power manager 108 to operate the identified actuator according to a predetermined operation frequency and/or voltage amplitude, in an attempt to de-clog the jet orifice. Step 916 proceeds to step 912.

When it is determined, at step 912, that the absorption profiles are within the predetermined tolerances, step 912 proceeds to step 918. At step 918, it is determined whether strain gauge signals of one or more actuators 110 are within predetermined tolerances. For example, controller 106 may monitor strain gauge signals of strain gauges (examples of diagnostic sensor 124) mounted on piezoelectric discs 508 FIG. 5A) of actuators 110. For example, when a piezoelectric disc 508 is operating normally, the strain gauge signal may exhibit a sinusoidal shape. If piezoelectric disc 508 is cracked or broken, the strain gauge signal may still be somewhat sinusoidal with a reduced amplitude or the signal may be a flat line.

When it is determined, at step 918, that the strain gauge signals are within the predetermined tolerances, step 918 proceeds to step 808 or step 812 (FIG. 8).

When it is determined, at step 918, that the strain gauge signals are outside of the predetermined tolerances, step 918 proceeds to step 920. At step 920, controller 106 determines that a piezoelectric disc 508 is broken. At step 922, controller 106 stores an indication, such as in storage 118, that the identified actuator cartridge 518 should be replaced. At step 924, controller 106 regulates operation of the remaining functional actuators to compensate for the broken actuator. Step 924 proceeds to step 808 or to step 812.

Figure 10:
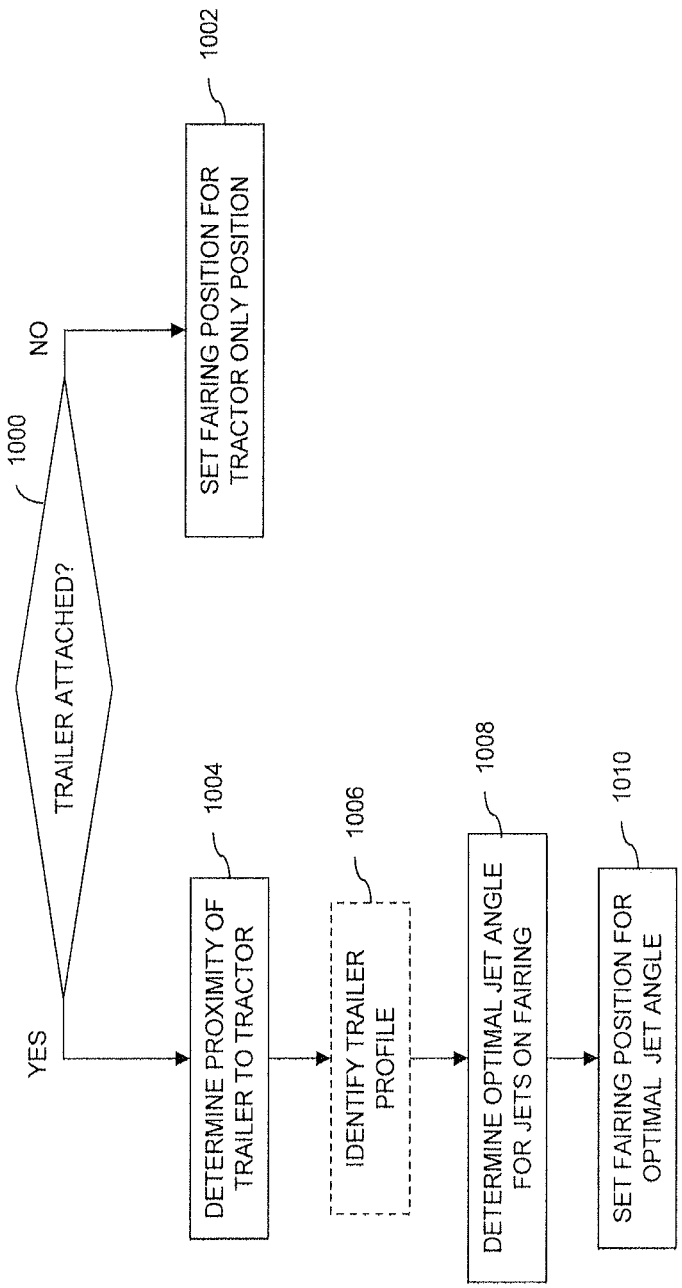
FIG. 10 is a flow chart illustrating an exemplary method of performing jet angle control of a jet angle-controlled fairing, according to an embodiment of the invention.

Referring to FIG. 10, a flow chart is shown of an example method of performing jet angle control by adjusting the fairing position according to whether a trailer is attached (optional step 810 in FIG. 8). At step 1000, it is determined, by controller 106, whether a trailer is attached, based on the trailer indication determined in step 808 (FIG. 8).

When it is determined, at step 1000, that a trailer is not attached, step 1000 proceeds to step 1002. At step 1002, the fairing position is set (either manually or via fairing servomotor 112 by controller 106) for a tractor only position, such as the position shown in FIG. 3A. In this manner, the jet angle for synthetic jets 212 of actuators 110 on fairing device 114 may be adjusted inwards toward the tractor gap.

When it is determined, at step 1000, that a trailer is attached, step 1000 proceeds to step 1004. At step 1004, controller 106 determines a proximity of the tractor to the trailer, such as from proximity sensor data of proximity sensor 128. At optional step 1006, controller 106 may detect a trailer profile. For example, the driver may select the trailer profile from among a list of predetermined trailer profiles, via driver interface 116. As another example, controller 106 may detect the trailer profile based on its coupling to the tractor, a weight of the trailer, etc. As a further example, controller 106 may detect the trailer profile based on proximity sensor data from one or more proximity sensors 128 (e.g., proximity sensors 128 acting as a radar system).

At step 1008, an optimal jet angle for synthetic jets 212 of actuators 110 on fairing device 114 is set by controller 106, based on the trailer proximity (step 1004) and/or the trailer profile (optional step 1006). At step 1010 the fairing position is set (either manually or via fairing servomotor 112 by controller 106) for a trailer included position, such as the position shown in FIG. 3B.

Figure 11:
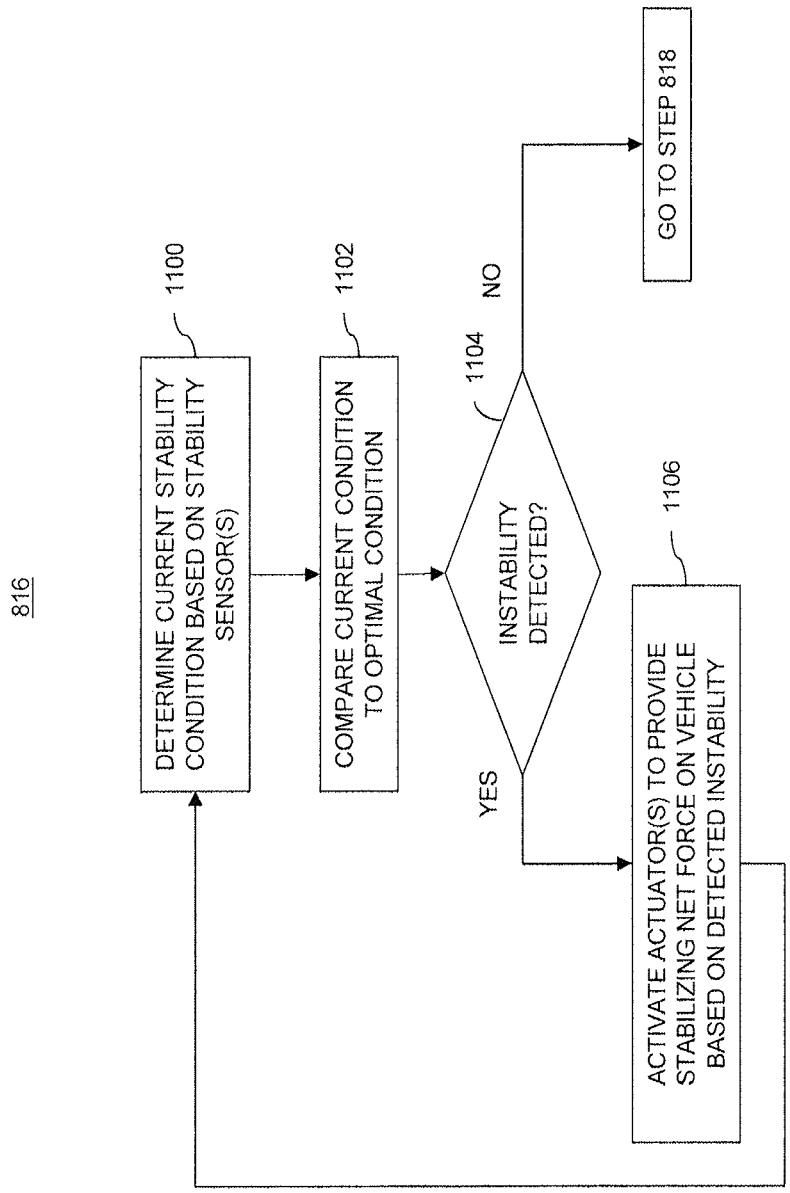
FIG. 11 is a flow chart illustrating an exemplary method for controlling the stability of the vehicle, according to an embodiment of the invention.

Referring to FIG. 11, a flow chart is shown of an example method of controlling vehicle stability (optional step 816 in FIG. 8). At step 1100, controller 106 determines the current vehicle stability condition based on one or more stability sensors 128 mounted on vehicle 100. For example, one or more stability sensors 128 such as a center of gravity, a weight and/or an accelerometer may be mounted on the vehicle body (such as a trailer) which may be prone to unstable movement (such as slipping).

At step 1102, the current condition (step 1100) is compared, by controller 106 to a predetermined optimal stability condition (which may be stored in storage 118).

At step 1104, it is determined whether an instability is detected, by controller 106, based on the comparison in step 1102. When it is determined, at step 1104, that an instability is not detected, step 1104 proceeds to step 818 (FIG. 8).

When it is determined, at step 1104, that an instability is detected, step 1104 proceeds to step 1106. At step 1106, controller 106 controls power manager 108 to activate one or more actuators 110 to provide a stabilizing net force on vehicle 100, based on the detected instability. For example, if the trailer slides to the left while vehicle 100 is moving, some actuators 110 may be activated while other actuators 110 may be terminated to cause the trailer to move in the opposite direction (i.e., to the right).

Step 1106 proceeds to step 1100, and steps 1100-1106 are repeated until no further instabilities are detected.

Figure 12B:
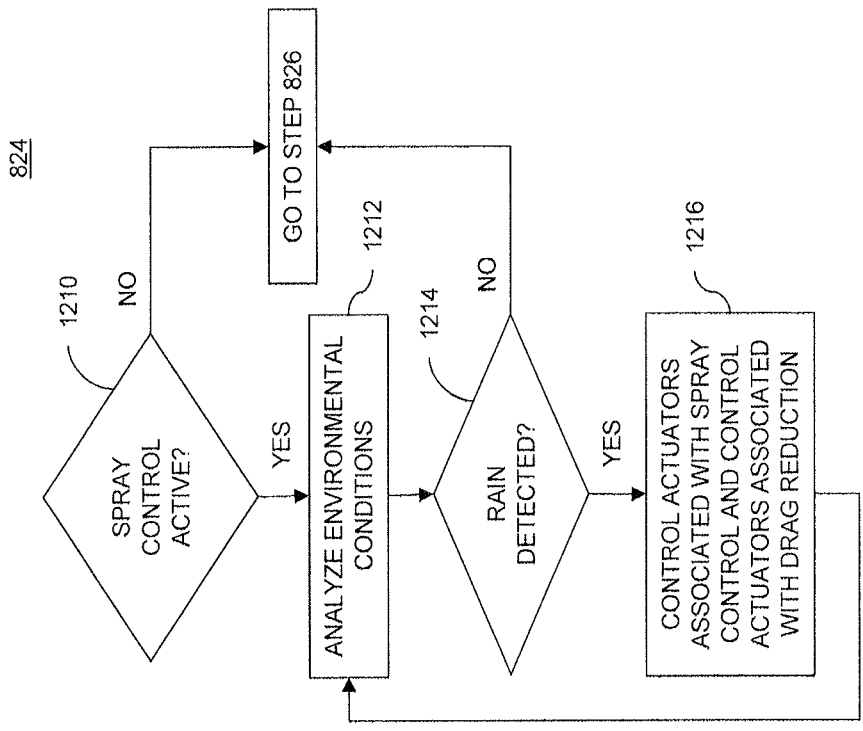
FIGS. 12A and 12B are flow charts illustrating exemplary methods for performing spray control using one or more actuators of the airflow control system shown in FIG. 1A, according to embodiments of the present invention.
Figure 12A:
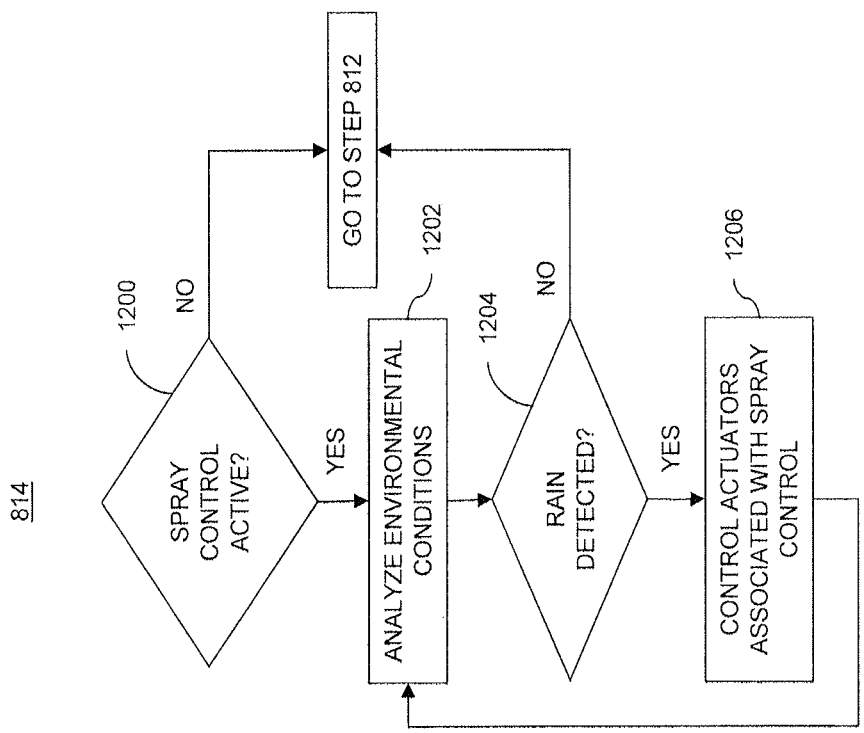

Referring to FIGS. 12A and 12B, flow charts are shown of example methods of performing spray control. In particular, FIG. 12A represents spray control when vehicle 100 is moving at less than the predetermined velocity threshold (optional step 814); and FIG. 12 represents spray control when vehicle 100 is moving at greater than the predetermined velocity threshold (optional step 824).

Referring to FIG. 12A, at step 1200, it is determined, by controller 106, whether the spray control mode is active. When it is determined that the spray control mode is not active, step 1200 proceeds to step 812 (FIG. 8).

When it is determined that the spray control mode is active, step 1200 proceeds to step 1202. At step 1202, the controller 106 receives environmental sensor data from environmental sensor(s) 120 (such as directly from a rain sensor a temperature sensor and/or a humidity sensor) and performs an analysis of the current environmental conditions to detect rain.

At step 1204, it is determined, by controller 106, whether rain is detected, based on the current environmental conditions (step 1202). When it is determined that rain is not detected, step 1204 proceeds to step 812 (FIG. 8).

When it is determined that rain is detected, step 1204 proceeds to step 1206. At step 1206, controller 106 controls operation of one or more actuators associated with spray control. For example, actuators on at least one of a rear of a tractor, a front of the tractor, a side of a trailer, a bottom of the trailer, a rear of the trailer, a wheel fender of the tractor or a wheel fender of the trailer may be actuated for spray control. Step 1206 proceeds to step 1202.

Referring to FIG. 12B, at step 1210, it is determined, by controller 106, whether the spray control mode is active. When it is determined that the spray control mode is not active, step 1210 proceeds to optional step 826 (FIG. 8).

When it is determined that the spray control mode is active, step 1210 proceeds to step 1212. At step 1212, the controller 106 receives environmental sensor data from environmental sensor(s) 120 (such as directly from a rain sensor a temperature sensor and/or a humidity sensor) and performs an analysis of the current environmental conditions to detect rain.

At step 1214, it is determined, by controller 106, whether rain is detected, based on the current environmental conditions (step 1212). When it is determined that rain is not detected, step 1214 proceeds to optional step 826 (FIG. 8).

When it is determined that rain is detected, step 1214 proceeds to step 1216. At step 1216, controller 106 controllers operation of one or more actuators associated with both spray control and drag reduction. For example, actuators on at least one of a rear of a tractor, a front of the tractor, a side of a trailer, a bottom of the trailer, a rear of the trailer, a wheel fender of the tractor or a wheel fender of the trailer may be actuated for spray control and drag reduction. Step 1216 proceeds to step 1212.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for airflow control of a moving ground vehicle, the system comprising:
    an actuator module, mounted on the vehicle, having at least one synthetic jet actuator configured to generate a synthetic jet, to modify an airflow around the vehicle;
    a sensor unit, mounted on the vehicle, having at least one environment sensor configured to capture environmental sensor data proximate the vehicle;
    a controller configured to receive the environmental sensor data from the sensor unit and to determine at least one of a drive frequency and a drive amplitude for controlling the at least one synthetic jet actuator, based on the received environmental data; and
    a power manager electrically coupled to the at least one synthetic jet actuator, the power manager configured to generate an oscillating voltage signal based on the at least one of the drive frequency and the drive amplitude determined by the controller, the oscillating voltage signal being used to drive the at least one synthetic jet actuator.

2. The system of claim 1, wherein the environmental sensor includes at least one of a temperature sensor or a humidity sensor.

3. The system of claim 1, the system further comprising a mounting frame disposed on the vehicle, the actuator module configured to be coupled to the mounting frame, the mounting frame electrically connecting the at least one synthetic jet actuator to the power manager.

4. The system of claim 1, wherein the actuator module is configured to be detachably coupled to the vehicle.

5. The system of claim 1, wherein:
    the sensor unit includes at least one velocity sensor configured to capture velocity sensor data of the vehicle, and
    the controller is configured to control operation of the at least one synthetic jet actuator when the captured velocity sensor data is greater than a predetermined velocity threshold.

6. The system of claim 1, further comprising a fairing device movably coupled to the vehicle, the actuator module being mounted on or integrated with the fairing device, the controller being configured to control adjustment of the fairing device to modify a direction of the generated synthetic jet.

7. The system of claim 6, wherein the vehicle includes a tractor coupled to a trailer and the sensor unit includes at least one proximity sensor configured to capture proximity sensor data of a proximity of the tractor to the trailer, and
    the controller is configured to control the adjustment of the fairing device based on the proximity sensor data.

8. The system of claim 1, wherein the controller is configured to detect a rain condition based on the environmental sensor data, and to adjust operation of the at least one synthetic jet actuator to control a spray direction of rain around the vehicle.

9. The system of claim 1, wherein the actuator module includes a plurality of actuator modules positioned at different locations on the vehicle, operation of each of the actuator modules being independently controlled by the controller.

10. A system for airflow control of a moving ground vehicle, the system comprising:
    an actuator module, mounted on the vehicle, having at least one synthetic jet actuator configured to generate a synthetic jet, to modify an airflow around the vehicle; and
    a sensor unit, mounted on the vehicle, having at least one environment sensor configured to capture environmental sensor data proximate the vehicle;
    a controller configured to receive the environmental sensor data from the sensor unit and to determine at least one of a drive frequency and a drive amplitude for controlling the at least one synthetic jet actuator, based on the received environmental data,
    wherein:
    the sensor unit includes at least one diagnostic sensor configured to capture diagnostic sensor data associated with the actuator module, and
    the controller is configured to detect a predetermined condition of the actuator module based on the diagnostic sensor data, the predetermined condition including at least one of a predetermined mechanical condition or a predetermined electrical condition.

11. The system of claim 10, further comprising a driver interface coupled to the controller, the driver interface configured to provide an indication of the detected predetermined condition to an occupant of the vehicle.

12. A system for airflow control of a moving ground vehicle, the system comprising:
    an actuator module, mounted on the vehicle, having at least one synthetic jet actuator configured to generate a synthetic jet, to modify an airflow around the vehicle;
    a sensor unit, mounted on the vehicle, having at least one environment sensor configured to capture environmental sensor data proximate the vehicle; and
    a controller configured to receive the environmental sensor data from the sensor unit and to determine at least one of a drive frequency and a drive amplitude for controlling the at least one synthetic jet actuator, based on the received environmental data,
    wherein:
    the sensor unit includes at least one stability sensor configured to capture stability sensor data associated with movement of the vehicle, and
    the controller is configured to detect an unstable movement of the vehicle based on the stability sensor data, and to adjust operation of the at least one synthetic jet actuator to provide a stabilizing net force on the vehicle.

13. A method for airflow control of a moving ground vehicle, the method comprising:
capturing environmental sensor data proximate the vehicle from an environmental sensor mounted on the vehicle;
determining, by a controller, at least one of a drive frequency and a drive amplitude for controlling at least one synthetic jet actuator mounted on the vehicle, based on the received environmental data;
generating a synthetic jet by the at least one synthetic jet actuator based on the at least one of the drive frequency and the drive amplitude, to modify an airflow around the vehicle;
capturing diagnostic sensor data associated with the at least one synthetic jet actuator by at least one diagnostic sensor; and
detecting, by the controller, a predetermined condition of the at least one synthetic jet actuator based on the diagnostic sensor data, the predetermined condition including at least one of a predetermined mechanical condition or a predetermined electrical condition.

14. The method of claim 13, the method further comprising:
capturing velocity sensor data of the vehicle by at least one velocity sensor mounted on the vehicle; and
controlling, by the controller, operation of the at least one synthetic jet actuator when the captured velocity sensor data is greater than a predetermined velocity threshold.

15. The method of claim 13, wherein the at least one synthetic jet actuator is mounted on or integrated with a fairing device, the fairing device movably coupled to the vehicle, the method including:
controlling, by the controller, adjustment of the fairing device to modify a direction of the generated synthetic jet of the at least one synthetic jet actuator.

16. The method of claim 15, wherein the vehicle includes a tractor coupled to a trailer and the method further comprises:
capturing proximity sensor data of a proximity of the tractor to the trailer from at least one proximity sensor mounted on the vehicle; and
controlling, by the controller, the adjustment of the fairing device based on the proximity sensor data.

17. The method of claim 13, the method further comprising:
detecting, by the controller, a rain condition based on the environmental sensor data; and
adjusting operation of the at least one synthetic jet actuator to control a spray direction of rain around the vehicle.

18. A method for airflow control of a moving ground vehicle, the method comprising:
capturing environmental sensor data proximate the vehicle from an environmental sensor mounted on the vehicle;
determining, by a controller, at least one of a drive frequency and a drive amplitude for controlling at least one synthetic jet actuator mounted on the vehicle, based on the received environmental data;
generating a synthetic jet by the at least one synthetic jet actuator based on the at least one of the drive frequency and the drive amplitude, to modify an airflow around the vehicle;
capturing stability sensor data associated with movement of the vehicle from at least one stability sensor mounted on the vehicle;
detecting, by the controller, an unstable movement of the vehicle based on the stability sensor data; and
adjusting operation of the at least one synthetic jet actuator to provide a stabilizing net force on the vehicle.

* * * * *